United States Patent
Dalgleish et al.

(10) Patent No.: US 10,055,618 B1
(45) Date of Patent: Aug. 21, 2018

(54) RFID READER FOR RFID SENSORS

(71) Applicants: Scott David Dalgleish, Boulder, CO (US); David Scott Kramer, Erie, CO (US); Eric Scott Harden, Arvada, CO (US)

(72) Inventors: Scott David Dalgleish, Boulder, CO (US); David Scott Kramer, Erie, CO (US); Eric Scott Harden, Arvada, CO (US)

(73) Assignee: Phase IV, Inc., Boulder, CO (US)

( * ) Notice: Subject to any disclaimer, the term of this patent is extended or adjusted under 35 U.S.C. 154(b) by 0 days.

(21) Appl. No.: 15/436,849

(22) Filed: Feb. 19, 2017

(51) Int. Cl.
G06K 7/08 (2006.01)
G06K 7/10 (2006.01)

(52) U.S. Cl.
CPC ..... *G06K 7/10316* (2013.01); *G06K 7/10366* (2013.01)

(58) Field of Classification Search
CPC ...... G06K 7/0008; G06F 3/4154; G06F 3/147
USPC ....................................................... 235/451
See application file for complete search history.

(56) References Cited

U.S. PATENT DOCUMENTS

| | | | |
|---|---|---|---|
| 2011/0128130 A1* | 6/2011 | Ting ............... | G06K 19/07309 340/10.42 |
| 2014/0138448 A1* | 5/2014 | Lee ................ | H04L 9/0891 235/492 |
| 2017/0195876 A1* | 7/2017 | Tahan ............. | H04L 9/06 |
| 2017/0272422 A1* | 9/2017 | Shoarinejad ..... | G06Q 20/409 |

* cited by examiner

*Primary Examiner* — Ahshik Kim
(74) *Attorney, Agent, or Firm* — Kenneth Altshuler (57) ABSTRACT

An RFID apparatus is disclosed generally comprising an RFID reader antenna attached to a microprocessor, the RFID reader antenna adapted to receive a first digital signal from a first RFID sensor and a second digital signal from a second RFID sensor. The RFID apparatus further possesses a converter that converts the first digital signal to a first analog output, such as electrical current, and the second digital signal to a second analog output. The apparatus can further possess a first electrical wire adapted carry the first analog output to a control system when the first electrical wire is connected to the control system. Also the apparatus can possess a second electrical wire adapted to carry the second analog output to the control system when the second electrical wire is connected to the control system. The control system is external to RFID apparatus and independent of the RFID apparatus.

18 Claims, 8 Drawing Sheets

RFID READER FOR RFID SENSORS

CROSS-REFERENCE TO RELATED APPLICATIONS

This application is a non-provisional application which claims priority to and the benefit of U.S. Provisional Patent Application Ser. No. 62/297,289, entitled RFID READER FOR RFID SENSORS filed Feb. 19, 2016, the entire disclosure of which is hereby incorporated by reference.

FIELD OF THE INVENTION

The present invention relates generally to a system and method of converting and directing multiple digital RFID sensor signals to analogue values and digital values along a plurality of pathways.

DESCRIPTION OF RELATED ART

Radio Frequency IDentification (RFID) systems are used in libraries and retail stores, like Home Depot. In these applications, special RFID tags are placed on books and expensive tools. When the book or tool passes by an RFID reader, the identification of the book or tool is read by the reader using radio waves. One unique aspect of RFID technology is that an identification number can be transmitted wirelessly using radio energy from an RFID tag, without any battery in the RFID tag. This particular kind of RFID tag is considered a passive RFID tag because it is powered from radio wave energy. In contrast, active RFID tags are generally powered through small batteries.

Figure 1:
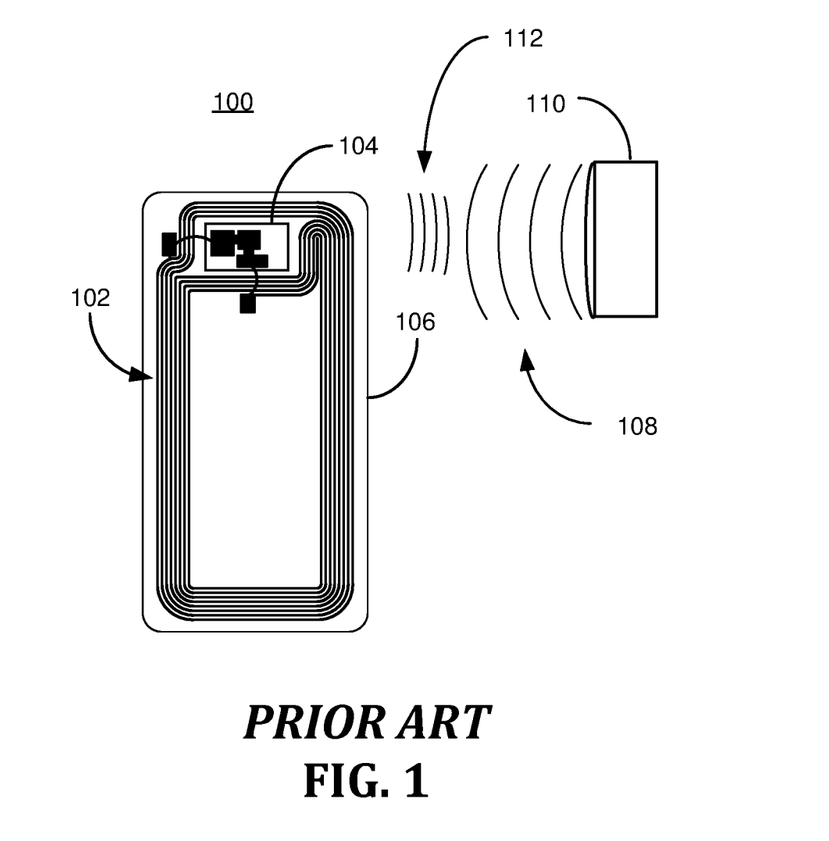
FIG. 1 shows a prior art image of an RFID tag.

An example of a passive RFID tag arrangement is illustratively shown in FIG. 1. In this arrangement, the RFID tag 100 harnesses electromagnetic waves, or radio energy 108, provided by a reader 110 (sometimes called an interrogator) when the RFID tag 100 is within the interrogation zone. The interrogation zone is the physical distance within which the strength of the electromagnetic waves 108 generated by the reader is able to power the RFID tag 100 to receive signals 112 from the tag 100. The radio energy 108 is harnessed by way of an antenna 102 that powers a chipset 104. The chipset 104 possesses, among other things, communication capability, memory, and in some cases a transducer to measure a physical effect, such as temperature and pressure, for example ("RFID Sensor"). The RFID reader 110 acts as a master for the RFID tag 100 and a slave for an application host (not shown). Typically, an RFID tag is designed to store certain information, typically which varies between 32 bits and 32,000 bytes of data.

In library books, the tag may be programmed with its ISBN number. In retail stores, the product ID may be the product's UPC code. In more sophisticated RFID memory tags, other data such as price or weight or expiration date may be programmed into the tag's extended memory.

As the name implies, RFID systems were designed to transmit Identification information. The data is always transmitted digitally so that the user of the data gets an exact string of data. For example if the tag ID# is "16" the tag will transmit a digital signal of 001-110, which translates to "1" and "6" in digital bits ("1" and "0") signals that are wirelessly transmitted.

Once the RFID reader gets the ID number from the tag, the reader will send the identification data to a computer database. For example, when the person holding a book walks by the RFID reader at the entrance of the library, the ID number will be read from the book and sent to a library data base where it can be determined if the book leaving the library was checked-out or not. Actions, such as triggering an alarm, can be taken if the book leaving the library was not checked-out, for example.

The reader sends the ID data to the database using a standard digital protocol such as RS232 or Ethernet. Digital signals are sent over a wire to the computer data base to transmit the ID number from the RFID reader to the computer data base.

Because RFID readers need to send exact ID numbers to computers, every RFID reader has a digital output where 1s and 0s are sent using positive voltage pulses for 1s and zero volt pulses for 0s. RFID readers in turn are only capable of sending digital identification numbers along with any digital form of sensor information from an RFID sensor that may accompany the digital identification numbers. In other words, to pass along data to a computer, the RFID sensor ID number is sent with the sensor reading, both digitally over a single electrical cable.

It is to innovations related to this subject matter that the claimed invention is generally directed.

SUMMARY OF THE INVENTION

The present embodiments generally relate to an RFID apparatus comprising an RFID reader antenna; a microprocessor communicatively linked with the RFID reader antenna, the RFID reader antenna adapted to receive a first digital signal from a first RFID sensor and a second digital signal from a second RFID sensor, and so on with n sensors; a converter that converts the first digital signal to a first analog signal (such as a voltage or current signal) and the second digital signal to a second analog signal (such as a voltage or current signal), and so forth for n digital signals; a first electrical wire extending from the apparatus adapted to carry the first analog signal to a control system when the first electrical wire is connected to the control system; and a second electrical wire extending from the apparatus adapted to carry the second analog signal to the control system or a different control system when the second electrical wire is connected to either the control system or the different control system, and so forth for n analog signals. The control system and the different control system are external to RFID apparatus and independent of the RFID apparatus.

Certain embodiments envision the RFID apparatus wherein the RFID reader, the microprocessor, and the converter are completely enclosed in an enclosure. Or, the RFID apparatus wherein the microprocessor is adapted to identify the first RFID sensor and control the converter to convert the first digital signal to the first analog signal (voltage or current) and direct the first analog signal output to the first electrical wire and wherein the microprocessor is adapted to identify the second RFID sensor and control the converter to convert the second digital signal to the second analog signal (voltage or current) and direct the second analog signal to the second electrical wire, and so forth for n RFID sensors. Or, the RFID apparatus wherein the microprocessor is adapted to determine that the first digital signal is from a first type of measuring sensor and the second digital signal is from a second type of measuring sensor different from the first type of measuring sensor, which can further include the measuring sensors are selected from a group consisting of temperature sensor, strain sensor, light sensor, sound sensor, power sensor, speed sensor, pressure sensor, flow sensor, or other sensor. Or the RFID apparatus further comprising a switch system adapted to direct the first analog signal to the first electrical wire and the second analog signal to the second electrical wire. Or the RFID apparatus further comprising a user input interface linked with the microprocessor, the microprocessor adapted to receive instructions directed to the first RFID sensor and the second RFID sensor, and so on to n sensors.

Other embodiments of the present invention contemplate a method comprising: identifying a first RFID sensor and a second RFID sensor via an RFID reader antenna computing system; receiving a first digital signal related to a first physical parameter from the first RFID sensor via the RFID reader antenna computing system; determining the first sensor type from the first physical parameter; converting the first digital signal to a first analog signal from a first range associated directly with the first physical parameter; directing the first analog signal to a first wire, the first wire extending from where the first analog signal is generated to a first control system; receiving a second digital signal related to a second physical parameter from the second RFID sensor via the RFID reader antenna computing system; determining the second sensor type from the second physical parameter; converting the second digital signal to a second analog signal from a second range associated directly with the second physical parameter; directing the second analog signal to a second wire, the second wire extending from where the second analog signal is generated to either the first control system or a second control system.

Certain embodiments envision the method wherein the receiving steps, the determining steps, the converting steps, and the directing steps are all accomplished within a housing and the first wire and the second wire extend from the housing to the first control system and the second control system, which could further include the receiving steps, the determining steps, the converting steps, and the directing steps are all accomplished via a computing system within the housing, or could further include interfacing with the computing system via a user interface possessing at least a display screen, or could optionally further include the receiving steps, the determining steps, the converting steps, and the directing steps are all accomplished automatically by the computing system. The method is further envisioned to have the computing system automatically establish all calibrations and offsets stored in the RFID reader antenna computing system from the calibrations and offsets retrieved from the first RFID sensor and the second RFID sensor. This can further include the calibrations and offsets automatically factored in to the converting step. While other embodiments envision the method wherein the directing step is accomplished via a switch system that links the first digital signal (such as a number in the tag serial number or in the tag memory) from the first sensor to the first wire and the second digital signal from the second sensor to the second wire. Yet other embodiments contemplate the method wherein the first and the second physical parameters are selected from a group consisting of temperature, strain, light, sound, power, speed, force, pressure, flow, and other sensor values.

DETAILED DESCRIPTION

Initially, this disclosure is by way of example only, not by limitation. Thus, although the instrumentalities described herein are for the convenience of explanation, shown and described with respect to exemplary embodiments, it will be appreciated that the principles herein may be applied equally to various RFID sensors operating in a variety of environments that can, in certain embodiments, be used with analog input control systems, for example. In what follows, similar or identical structures may be identified using identical callouts.

Embodiments of the present invention are generally directed to receiving digital RFID numbers and digital sensor readings associated with the digital RFID numbers and converting the digital sensor readings to analog values, which are transmitted along wire lines that correspond to the digital RFID numbers. Among other things, this solves a long-standing problem of sending multiple RFID sensor tag data along with an RFID number in an analog arrangement.

Figure 2:
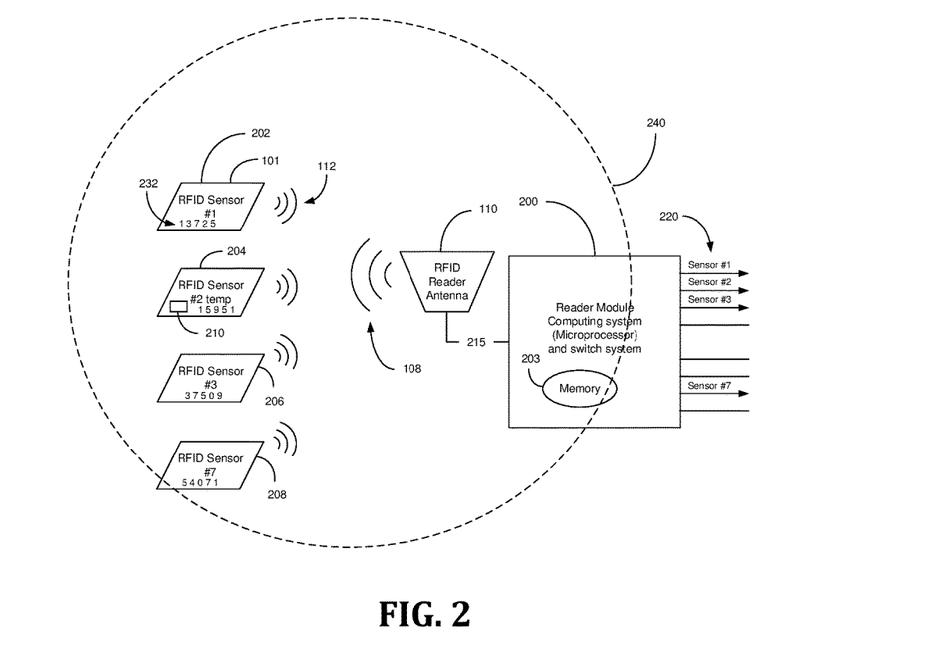
FIG. 2 illustratively depicts an embodiment of an RFID computing system in communication with four RFID sensor tags constructed in accordance with various embodiments of the present invention.

FIG. 2 illustratively depicts an embodiment of an RFID computing system in communication with four RFID sensor tags constructed in accordance with various embodiments of the present invention. The four RFID sensor tags 202, 204, 206, and 208 are located within the interrogation zone 240 of the RFID reader antenna 110. To simplify callouts, RFID sensor tag/s will be generically denoted as element 101. In this embodiment, the reader antenna 110 is integrated 215 with the computing and switch system 200. The computing and switch system 200 possesses the appropriate microprocessor/s, algorithms and non-transitory memory 203, such as volatile or nonvolatile memory (e.g., disk drive, solid state memory, etc.). Each RFID sensor tag 101 is equipped with a transducer that is capable of sensing a physical parameter, such as temperature, pressure, strain, etc. For purposes of discussion, RFID sensor tag #2 204 is equipped with a temperature sensor. When interrogated by the RFID reader antenna 110, RFID sensor tag #2 204 will send a unique ID number and the temperature reading. In the present embodiment, RFID sensor tag #2 is more sophisticated than a simple temperature sensor in that RFID sensor tag #2 transmits a unique ID number, a "raw" temperature number, and the calibration adjustment number, that the reader/computing system 200 can use to calculate a more accurate calibrated temperature. Each of the RFID sensor tags 101 possesses a serial number 232. For example, RFID sensor tag #1 202 possesses a serial number '1 3 7 2 5'. However, RFID serial numbers are typically longer, sometimes exceeding 18 digits.

Figure 3:
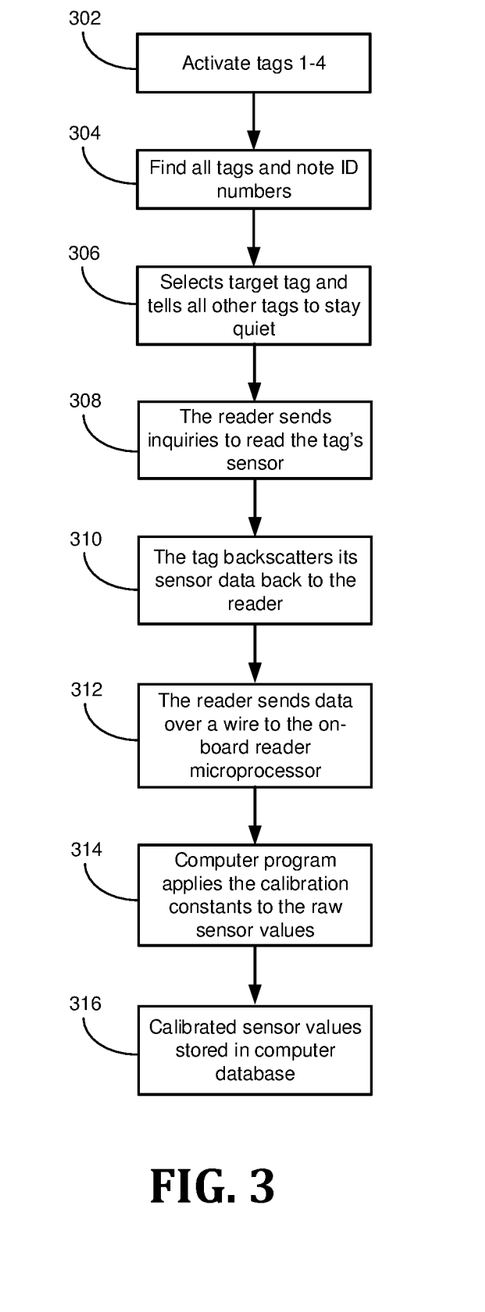
FIG. 3 is an embodiment of a basic flowchart describing a process that can be used in conjunction with FIG. 2 consistent with embodiments of the present invention.

FIG. 3, in view of FIG. 2, is a simplified embodiment of a basic flowchart describing a process to initialize and RFID sensor tag consistent with embodiments of the present invention. Step 302, all of the RFID sensor tags 101, which are in the interrogation zone 240, are activated by electromagnetic waves generated by the RFID reader antenna 110. The RFID reader antenna 110 and the computer system 100 proceed with a singulating routine, which systematically inquires what the serial numbers 232 are for each RFID sensor tag 101 in the interrogation zone 240. Once found, the computing system 100 can generate a record of the RFID sensor tags 101 in the interrogation zone 240, step 304.

To illustrate an example of ascertaining all of the RFID sensor tags 101 in the interrogation zone 240, the RFID reader antenna 110 may start out with asking "is there a tag out there? If there is, talk back to me." Next, "I can see that there are four sensor tags out there, I cannot determine who is who." At this point, the RFID reader 110 performs an inventory function, which is an algorithm that essentially sequences serial numbers to identify all four RFID sensor tags 101. For example, "is there a tag out there who starts with a '1'?" Because, at this point, RFID sensor tag #1 202 and RFID sensor tag #2 204 both respond, the RFID reader antenna 110 will sequence the second digit in the serial number 232 (and if need be the third digit in the serial number, and so forth) to identify each RFID sensor tag 101. This process continues until each tag is identified. Once each tag is identified, the RFID reader antenna 110 can select an individual RFID sensor tag 101 with which to communicate (step 306).

The RFID reader 110 then determines what kind of sensor is associated with each RFID sensor tag 101 including any calibration information associated with each RFID sensor tag 101 by reading the data stored in each RFID sensor tag, step 308. For example, the RFID reader 110 may ask "what type of tag are you?" In so doing, the RFID reader 110 queries a specific memory location in the RFID sensor tag 101 to discover what kind of sensor is associated with the RFID sensor tag 101. The RFID reader 110 may then seek any calibration information associated with the specific RFID sensor tag 101. For example, "what does memory location '00' in sensor tag #2 have?" The RFID sensor tag 101 might answer "I am a type-1 tag." The RFID reader 110 says "okay, you are temperature tag. Also, I understand your memory location number '1' has a slope and memory location '2' has an offset." The slope and offset, considered the calibration constants, are read from the RFID sensor tag 101 and retained in memory 203 in the computing system 200. Certain embodiments contemplate a table constructed in the computing system 200 with information directed to each specific RFID sensor tag 101. One embodiment contemplates an RFID sensor tag 101 providing the resolution of a particular sensed parameter, such as temperature, in increments between 1 and 1000 counts (sensor counts). Hence, for temperature, the slope is the relationship between changing temperature versus counts and the offset is a plus or minus factor of the temperature (e.g., +2 degrees to everything measured), for example. Hence, if the temperature range is 0 degrees to 250 degrees, then each count is ¼ of a degree.

Continuing with FIG. 3, after identifying the RFID sensor tag 101 and establishing and recording the calibration constants (slope and offset) of the RFID sensor tag 101 with the computing system 200, the RFID reader antenna 110 sends inquiries to read the RFID sensor tag 101, step 308. The RFID sensor tag 101 sends its data back to the RFID reader 110, step 310. The RFID the reader 110 transmits the results to the computing system 200 via wire in raw sensor values, digital '0' and '1' bits, step 312. An algorithm running on the computer system 200 applies the calibration constants, e.g., slope and offset retained in memory 203, to the raw sensor values, step 314. The RFID reader 110 and the computing system 200 can use a table (stored in memory 203) that scales sensor counts from each RFID sensor tag 101 against a range of analog outputs. For example, RFID sensor tag #1 has a temperature sensor that outputs 0 counts when at 0° F. and 1000 counts at 250° F. (four counts per degree F.). The computing system 200 can be, in certain examples, an analog output that is 0-1.2 V. The computing system 200 can contain a table that would provide RFID sensor tag #1: Output in volts equals 1.2V/temperature count. The calibrated sensor values, such as temperature in Fahrenheit, can then be stored in the computer system 100, or some other database, tied to the particular sensor tag ID number 232.

Because RFID readers were originally designed for the narrowly focused use of transmitting identification (ID) data, all RFID readers transmit only digital information to an endpoint, such as a computer. Accordingly, advances in RFID technology to include transducers that provide data counts, such as 1-1000 counts over a range of a measured parameter (e.g., temperature), as received by an RFID reader is transmitted as digital data by RFID readers. There are no readers in existence that generate analog outputs because RFID readers were originally designed to send only digital ID data, which presents a problem in industrial environments. Most industrial machines are controlled by way of Programmable Logic Controllers (PLC), which are arranged to use analog input. Moreover, systems using analog values transmitted down a wireline (such as different current levels) are ill-equipped to also discriminate digital ID numbers, such as RFID tag numbers. Certain embodiments resolve these problems by converting digital values received from multiple RFID sensor tags 101 to analog current levels (such as in milliamps, mA) and sending the analog current levels to one or more wire lines 220 that are each dedicated to a specific RFID sensor tag 101. One embodiment depicting this is shown in FIG. 4A.

Figure 4A:
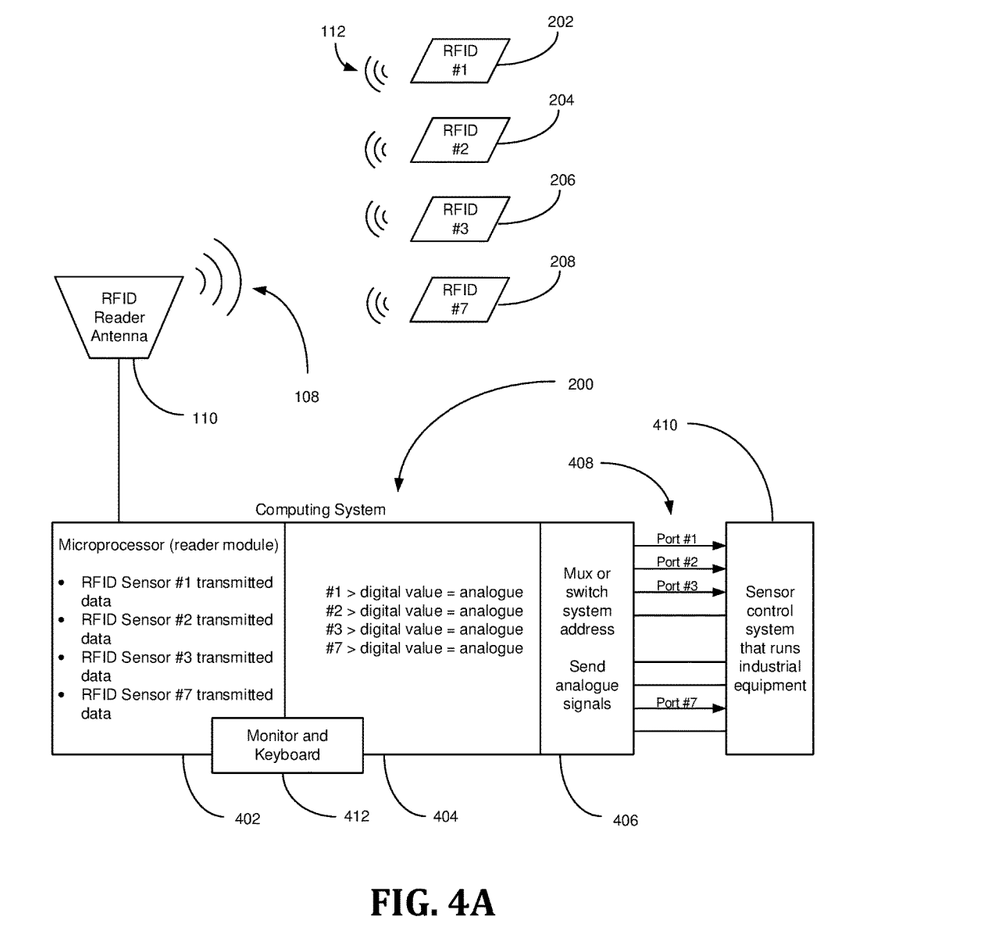
FIG. 4A illustratively depicts an embodiment of a computing system connected to a sensor control system consistent with embodiments of the present invention.

FIG. 4A illustratively depicts an embodiment of the computing system 200 connected to a sensor control system 410 that cooperates with industrial equipment consistent with embodiments of the present invention. After ascertaining the calibration constants of each RFID sensor tag 202, 204, 206, and 208 and storing the constants in computer memory 203, the RFID reader antenna 110 starts taking readings from each of the RFID sensor tags 101. Parameters associated with the RFID sensor tags 101 can be set through a keyboard and monitor 412 that interface to the computing system 200. The keyboard and monitor 412 can provide user interface prompts that can enable an operator to configure each RFID sensor tag 101. Certain embodiments contemplate the monitor displaying configuration questions, which can be used by the microprocessor to enhance how RFID sensor tag data is managed. For example, "how often do you want to read the sensor?" Every ______ seconds. "If a tag in the table cannot be read, how long should the reader wait until an error message is sent?" ______ seconds. "When sending an error message to a 4-20 mA output, output ______ mA (must be below 3.5 mA)." "Do a tag inventory on every power up? Y/N." "Read the tag calibration data on every power up? Y/N." "Delete tags from the table that are no longer used?"

Prompts are further envisioned to provide tag mapping, such as for example, by displaying the different tag ID numbers and permitting a user to select one of the RFID sensor tags to provide input, e.g., Tag unit of measure ______; Tag bottom range value ______; Tag top range value ______; Tag has calibration data Y N. The computing system 200 retaining calibration constants associated with each of the RFID sensor tags 101 (envisioned in one embodiment to be in a table), can manipulate the data to suit the needs of the end user, such as creative average RFID digital value for every sensor and convert the average digital value to an analog current value via a digital analog converter 404. The computing system 200 can direct the analog voltage signals by way of wire lines 408 assigned to each of the sensor signals via a switch system 406 to a sensor control device 410 intended to consume analog current values/signals, such as industrial equipment.

Some embodiments contemplate communicating with the computing system 200 by way of a remote access, such as a web page. In the embodiment concerning a webpage, the computing system 200 is uniquely identified by way of a web address. In other words, the computing system 200 is assigned a unique web address that when targeted creates a point-to-point connection between the web address inputter, such as an end-user, and the computing system 200. Accordingly, a webpage can be set up to control the computing system by way of input commands entered in the webpage that may be used to configure the reader module computing system 200. The webpage can also display output from the computing system 200. In other words, an end-user can access and, in certain embodiments, control the computing system 200 by way of the web page that serves as an input/output display interface. Some examples further envision the input/output interface being displayed on a computer monitor, or screen, linked to a keyboard, mouse, voice control, or other means of inputting information into the webpage page displayed on the monitor. It is further envisioned that the monitor can be remote from the computing system 200. Certain other embodiments envision a group of computing systems being associated with a single webpage that allows an end-user/s to manipulate and manage the group of computing systems.

Figure 4B:
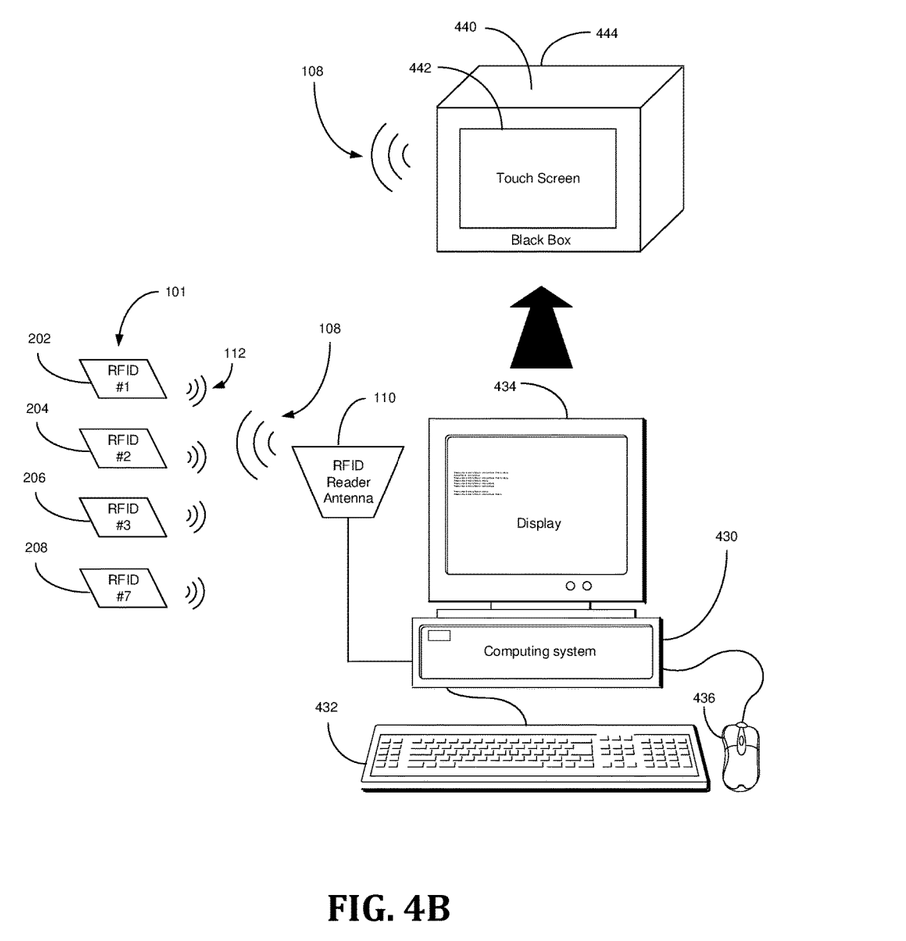
FIG. 4B illustratively depicts an embodiment of a black box RFID computing system consistent with embodiments of the present invention.

Certain embodiments contemplate low-touch acquisition of data produced by an RFID sensor tag 101, as depicted in FIG. 4B. As shown, the computing system 430 is in communication with RFID sensor tags #1-#4 202-208, via signals 108 RFID reader antenna 110. Optional embodiments contemplate the RFID reader antenna 110, the computing system 130, and the display 434 being integrated, see arrow, in a single housing 444 whereby the display 434 can be replaced by a touchscreen 442 eliminating the need for a keyboard 432 and mouse 436. The componentry within the single housing 444 can be considered an RFID system blackbox 440 because all of the functionality needed to cooperate with RFID tag sensors 101 within the single housing 444. Accordingly, the touchscreen 442 can display many of the same questions raised in the previous paragraph, and the blackbox 440 simply does the rest. Embodiments envision the blackbox 440 identifying all of the RFID sensor tags 101, constructing one or more tables for each RFID sensor tag calibration values, acquiring sensor values from each of the RFID sensor tags 101, storing the acquired sensor values either internally or in an off-site non-transient storage device, such as cloud storage, for example. The blackbox 440 can further possess a digital to analog module 446 that can provide the functionality of the digital to analog converter 404, the mux 406, the wire lines 408 depicted in FIG. 4A. Optional modules can provide digital outputs without any conversions or digital outputs with specific conversions depending on output requirements. The blackbox 440 possesses the appropriate macro processor/s, non-transient storage (HDD/s, SSD, etc.) and algorithms that carry out the complex functions, such as defined RFID sensor tag, read RFID sensor tags, calibrate RFID sensor tag readings, acquired data from each RFID sensor tag at specific intervals, etc. formerly carried out by an expert.

Figure 5:
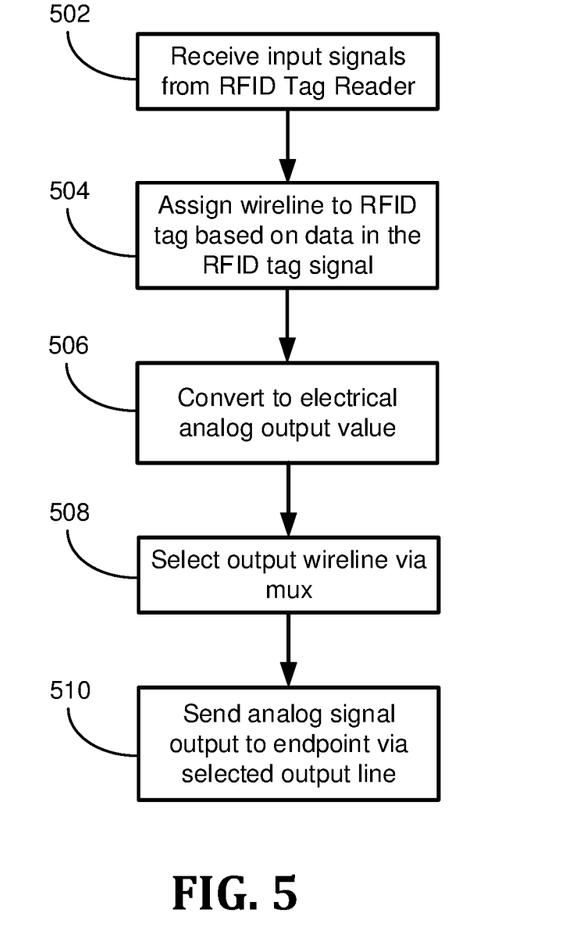
FIG. 5 is a block diagram of a method consistent with embodiments of the present invention.

FIG. 5 provides an example of a method embodiment in view of FIG. 4 consistent with embodiments of the present invention. To overcome the problem with RFID numbers transmitted along with analog sensor values, embodiments of the present invention contemplate assigning one of a plurality of wire lines 408 to each ID number. Hence, RFID sensor tag #1 202, RFID sensor tag #2 204, RFID sensor tag #3 206, and RFID sensor tag #4 208 will all have a dedicated wire lines 408, or ports, extending from the computing system 200 to the sensor control system that runs industrial equipment 410. Continuing from FIG. 3, each RFID sensor tag 101 transmits sensor data in the form of counts along with the unique RFID sensor tag number 232 to the RFID reader antenna 110 and to the reader module 402, step 502. The reader module 402 manages linking the RFID sensor tag ID number 232 to one of the analog outputs 408, step 504. For example, RFID sensor tag #1 202 is a temperature sensor tag that will send between 4-20 mA to output port #1, RFID sensor tag #3 206 is a pressure sensor tag that will send between 4-20 mA to output port #3, and so on. The reader module 402 further manages the conversion of a sensor output to a unit of measure and scale. One example contemplates the RFID sensor tag #1 202 sets temperature range where 4 mA=0° F., 20 mA=200° F., RFID sensor tag #3 206 sets pressure range where 4 mA=0 psi, 20 mA=250 psi. The reader module 402 will also manage applying the calibration coefficients to the raw sensor values. The values/counts received from each RFID sensor tag 101 is converted to an electrical analog output value, step 506. Some embodiments contemplate the electrical analog output value being generated based on a conversion table based on each RFID sensor tag # with specific calibrations stored in memory 203. For example, assuming the RFID sensor tag #1 202 receives a temperature of 314 counts, it converts to 78.5° F. and 10.28 mA. The voltage output values can be generated in the analog output engine 404 and directed to the appropriate port 408 by way of the multiplexer, or mux, device 406, steps 508 and 510. In this example, 10.28 mA is sent down port #1 to the sensor control system that runs industrial equipment, which in turn can enable the control system 410 that runs the industrial equipment to make adjustments to the industrial equipment to accommodate a change in temperature if needed.

Figure 6:
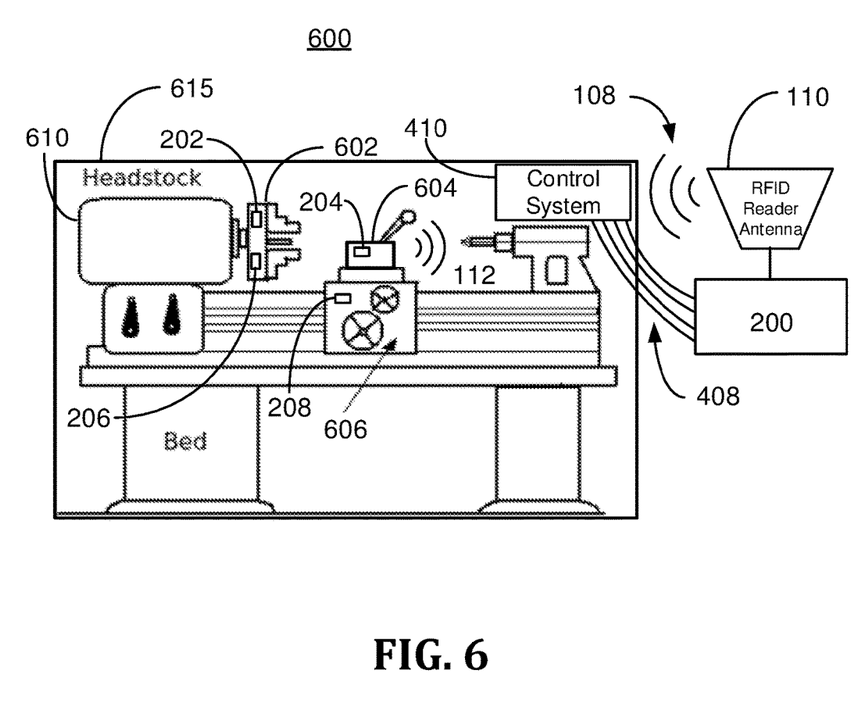
FIG. 6 illustratively depicts a commercial environment in which embodiments of the present invention can be practiced.

The arrangement of FIG. 4 can be commercially implemented on a machine, such as in a computer numerically controlled (CNC) lathe 600 depicted in FIG. 6, for example, to measure operating temperature of various lathe components with the four RFID sensor tags 202, 204, 206, and 208 disposed in the various lathe components. In one example depicted in FIG. 6, RFID sensor tag #1 202 and RFID sensor tag #3 206 are disposed on the lathe chuck 502, RFID sensor tag #2 204 is disposed at the cutting tool attachment 604, and RFID sensor tag #4 is disposed on the carriage 606. Because heat can build up inside of the lathe housing 605, which might threaten the functionality of the chuck motor 610 or motors associated with the carriage 606 and cutting tool 604, sensing temperature, for example can be of benefit to predict failure or damage before damage actually occurs. Moreover, these lathe components are capable of operating at a high rotational speed, which makes the wireless RFID sensor tags 101 ideal for sensing temperature, or other parameters associated with the lathe 600 (benefiting from elimination of wires). The control system 410, which controls the functions of the lathe 600, can be programmed to slow components down or stop the lathe 600 if a parameter being measured exceeds a predefined limit, such as an excessively high temperature or excessively high pressure, for example.

As depicted in the present embodiments, an RFID computing system 200 comprising an RFID reader antenna 110, which is connected to the lathe control system 410 via wire lines 408. Assuming all of the RFID sensor tags 202, 204, 206 and 208 are inside of the interrogation zone 240, the RFID reader antenna 110 can power and communicate with all of the RFID sensor tags 202, 204, 206 and 208. After ascertaining the calibration constants of each RFID sensor tag 202, 204, 206, and 208 and storing them in computer memory 203, the RFID reader antenna 110 starts taking readings from each of the RFID sensor tags 202, 204, 206 and 208. The raw signals (counts) come in from the RFID sensor tags 101 in digital form, are adjusted with the calibration constants for each RFID sensor tag 101 that is stored in memory 203, and are converted to a physical parameter, such as temperature.

Some embodiments envision several redundant sensor tags disposed on a component that may or may not be sending data to the RFID reader 110. For example, the lathe chuck 602 may comprise three RFID sensor tags 101 two of which are backup if the primary sensor tag malfunctions. Optionally, all three sensor tags could be transmitting data to the RFID reader antenna 110 and an average of the sensor measurements may be used in the digital to analog conversion that can then be sent to the control system 410 via the wire lines 408. Other embodiments contemplate all three sensor tags possessing identification numbers 232 starting with the same value, such as 1xxx (1001, 1002, 1003, etc.), 2xxx, or 3xxx, that way if one of the RFID sensor tags becomes disabled on the lathe chuck 602, then the RFID reader 110 will pick up a spare RFID sensor tag 101 and the computing system 200 will immediately be able to continue reading without human intervention disrupting the lathe 600. Certain embodiments contemplate the display with the computing system 200 providing the option of displaying all RFID sensor tags 101, specific RFID sensor tag 101, just temperature sensors, etc., for example.

Figure 7:
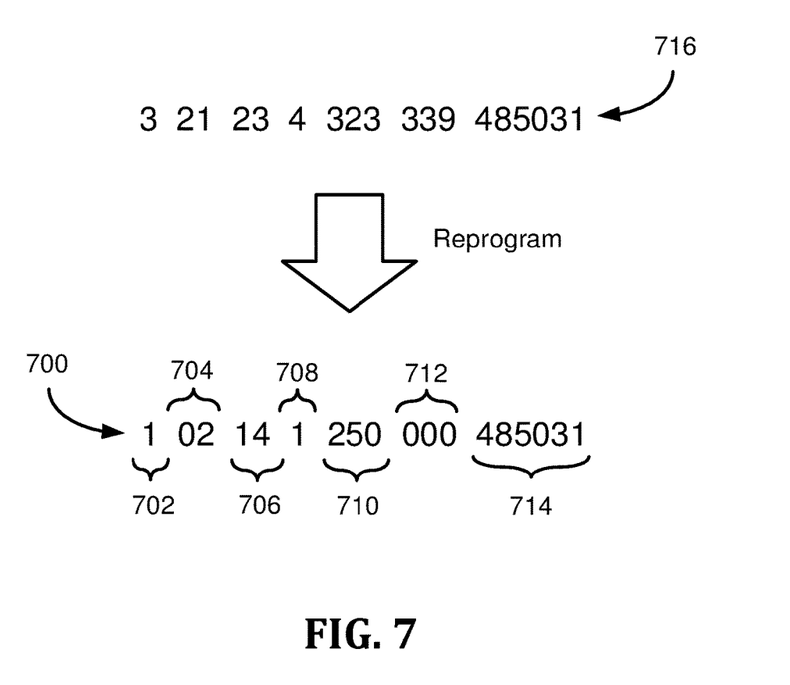
FIG. 7 illustratively depicts an embodiment of storing information in an ID tag consistent with embodiments the present invention.

Certain other embodiments contemplate the RFID reader in computer system 200 incorporating algorithms that will facilitate an RFID sensor tag 101 to be added to the system with no user configuration or programming. An example of this can include an RFID sensor tag 101 preloaded with calibration information, tag type, sensor type and where to route any output data in RFID tag memory, etc. All the data retained in the RFID tag memory can then be downloaded to the RFID reader/computer system 110/200 when the RFID sensor tag 101 is first read. One method to add this information to an RFID sensor tag 101 is by way of intelligently coding the RFID tag number 232 (EPC ID, Electronic Product Code). For example, as depicted in FIG. 7, an RFID tag number 716 may be comprised of eighteen digits, such as 321234323339485031. The RFID tag number 716 is envisioned to be reprogrammed where the first number 702 corresponds to the port 408 address where analog current of a measurement is transmitted, the next four numbers can correspond to the calibration data 704 and 706, the next number 708 can correspond to unit of measure, the next three numbers 710 can correspond to upper sensor range, the next three numbers 712 can correspond to lower sensor range, and the remaining numbers 714 can be the unique ID number. In other words, the output of the RFID sensor tag can be preprogrammed to provide <output port #> 702, <calibration data> 704 and 706, <unit of measure code> 708, <upper sensor range> 710, <lower sensor range> 712, <unique ID #> 714. Hence, the RFID tag 101 can be preprogrammed with a new RFID sensor tag #700 to send analog information to output port #1, offset of 2° with a slope of ¼, degrees Fahrenheit, upper range of 250°, lower range of 0°, unique ID number, which could look something like: 102141250000485031. With this type of tag configuration, further embodiments envision that the microprocessor would check to make sure that there are not two or more tags with different unique ID numbers that are assigned to the same port.

Other embodiments contemplate user configuration or programming to include creating configuration identifications and a configuration table that defines all of the configuration parameters for a RFID sensor tag 101. When the configuration ID of an RFID sensor tag 101 is read from the RFID sensor tag 101 (in the EPC ID, or particular memory location in the RFID sensor tag 101) the RFID reader 110 will properly read the RFID sensor tag 101 and configure the output data to properly output the RFID sensor tag readings with the proper signals.

Certain embodiments contemplate a single RFID sensor tag possessing more than one sensor. In this configuration, the computing system 200 can assimilate the data from the multiple sensors from an RFID sensor tag and coordinate transmitting the analog data from each of the sensor tags to different ports 408. Also, in this embodiment it is envisioned that a lookup table can accommodate data for a particular RFID sensor tag number having multiple sensors.

The RFID computing system 200 and the RFID antenna 110 are further envisioned to automatically tune, or "auto-tune", or self-tune, the RFID antenna 110 for maximum output power. Embodiments contemplate the RFID computing system 200 and the RFID antenna 110 possessing a plurality of capacitors (not shown) with different values in the RF output circuit. The microprocessor will sample the different value capacitors in an interrogation zone environment until a best fit capacitor value is found. The microprocessor will then assign the best fit capacitor. This is of benefit when the same RFID reader 110 computing system 200 are reading RFID tags close to a large metal plate in one application and in open air in a different application. Embodiments envision the auto-tune function being a simple button to click on the computing system 200 or by way of the keyboard and display monitor 412.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms used herein. For example, though most of the embodiments are directed to a single sensor on an RFID sensor tag, it is envisioned that a single RFID sensor tag can possess multiple sensors sampling different kinds of parameters whose analogue values can be piped down different ports while still maintaining substantially the same functionality without departing from the scope and spirit of the present invention. Another example can include a variety of different structures in which data is stored from an RFID sensor tag in memory 203 that may be different from tables described in certain embodiments while still maintaining substantially the same functionality without departing from the scope and spirit of the present invention. It will be appreciated that though voltage levels and current levels are described being used as analog signals, it is envisioned that other analog techniques could be employed, such as light, pressure, or other variable property that may be scaled to a sensor reading without departing from the scope and spirit of the present invention. Also, the terms "one" is synonymous with "a", which may be a first of a plurality.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. An RFID apparatus comprising:
    an RFID reader antenna;
    a microprocessor communicatively linked with said RFID reader antenna, said RFID reader antenna adapted to receive a first digital signal wirelessly from a first RFID sensor and a second digital signal wirelessly from a second RFID sensor;
    a converter that converts said first digital signal to a first analog output and said second digital signal to a second analog output;
    a first electrical wire extending from said apparatus, said first electrical wire adapted carry said first analog output to a control system when said first electrical wire is connected to said control system; and
    a second electrical wire extending from said apparatus, said second electrical wire adapted to carry said second analog output to said control system or a different control system when said second electrical wire is connected to either said control system or said different control system, said control system and said different control system are external to RFID apparatus and independent of said RFID apparatus.

2. The RFID apparatus of claim 1 wherein said first analog output contributes to controlling said controller.

3. The RFID apparatus of claim 1 wherein said RFID reader, said microprocessor, said converter are completely enclosed in a single enclosure.

4. The RFID apparatus of claim 1 wherein said microprocessor is adapted to identify said first RFID sensor and control said converter to convert said first digital signal to said first voltage and direct said first voltage to said first electrical wire and wherein said microprocessor is adapted to identify said second RFID sensor and control said converter to convert said second digital signal to said second voltage and direct said second voltage to said second electrical wire.

5. The RFID apparatus of claim 1 wherein said microprocessor is adapted to determine that said first digital signal is from a first type of measuring sensor and said second digital signal is from a second type of measuring sensor different from said first type of measuring sensor.

6. The RFID apparatus of claim 4 wherein said measuring sensors are selected from a group consisting of temperature sensor, strain sensor, light sensor, sound sensor, power sensor, speed sensor, and flow sensor.

7. The RFID apparatus of claim 1 further comprising a switch system adapted to direct said first voltage to said first electrical wire and said second voltage to said second electrical wire.

8. The RFID apparatus of claim 1 further comprising a user input interface linked with said microprocessor, said microprocessor adapted to receive instructions directed to said first RFID sensor and said second RFID sensor.

9. A method comprising:
    identifying a first RFID sensor and a second RFID sensor via an RFID reader device with an antenna;
    receiving a first digital signal related to a first physical parameter from said first RFID sensor via said RFID reader device;
    determining that said first sensor is a first sensor type from said first digital signal;
    converting said first digital signal to a first voltage derived from a first range of three or more voltages associated directly with said first physical parameter;
    applying said first voltage across a first wire via a voltage source, said first wire extending from said first voltage source to a first control system;
    receiving a second digital signal related to a second physical parameter from said second RFID sensor via said RFID reader device;
    determining that said second sensor is a second type from said second digital signal;
    converting said second digital signal to a second voltage from a second range of three or more voltages associated directly with said second physical parameter;
    applying said second voltage across a second wire, said second wire extending from said RFID reader device to either said first control system or a second control system.

10. The method of claim 9 wherein said receiving steps, said determining steps, said converting steps, and said applying steps are all accomplished within a common electronic housing and said first wire and said second wire extend from said common electronic housing to said first control system and said second control system.

11. The method of claim 10 wherein said receiving steps, said determining steps, said converting steps are all accomplished via a computing system within said housing.

12. The method of claim 11 further comprising interfacing with said computing system via a user interface possessing at least a display screen.

13. The method of claim 11 wherein said receiving steps, said determining steps, said converting steps, and said applying steps are all accomplished automatically by said computing system.

14. The method of claim 9 further comprising initiating communication with said first RFID sensor and said second RFID sensor prior to said identification step.

15. The method of claim 11 wherein said computing system automatically establishes all calibrations and offsets for said first RFID sensor and said second RFID sensor.

16. The method of claim 15 wherein said calibrations and offsets are automatically factored in to said converting step.

17. The method of claim 9 wherein said directing step is accomplished via a switch system that links said first digital signal from said first sensor to said first wire and said second digital signal from said second sensor to said second wire.

18. The method of claim 9 further comprising changing a machine controlled by said first control system based on said first voltage.

* * * * *